(12) United States Patent
Schwartz et al.

(10) Patent No.: US 8,756,978 B2
(45) Date of Patent: Jun. 24, 2014

(54) LEAK DETECTOR WITH OPTICAL TRACER GAS DETECTION

(75) Inventors: Vladimir Schwartz, Lexington, MA (US); Daniel Wetzig, Cologne (DE); Boris Chernobrod, Santa Fe, NM (US)

(73) Assignee: Inficon GmbH, Bad Ragaz (CH)

( * ) Notice: Subject to any disclaimer, the term of this patent is extended or adjusted under 35 U.S.C. 154(b) by 880 days.

(21) Appl. No.: 12/757,631

(22) Filed: Apr. 9, 2010

(65) Prior Publication Data

US 2011/0247400 A1    Oct. 13, 2011

(51) Int. Cl.
  *G01M 3/04* (2006.01)
(52) U.S. Cl.
  USPC ................................ 73/40.7; 73/40; 73/49.3
(58) Field of Classification Search
  USPC ......... 73/24.02, 24.06, 40.7, 49.2, 49.3, 49.5, 73/52; 250/339.01–342; 422/82.05
  See application file for complete search history.

(56) References Cited

U.S. PATENT DOCUMENTS

| | | | | |
|---|---|---|---|---|
| 5,661,229 | A * | 8/1997 | Bohm et al. | 73/40.7 |
| 6,107,627 | A * | 8/2000 | Nakagawa et al. | 250/292 |
| 6,277,177 | B1 | 8/2001 | Bley et al. | |
| 6,460,405 | B1 * | 10/2002 | Mayer et al. | 73/40.7 |
| 6,609,414 | B2 * | 8/2003 | Mayer et al. | 73/40.7 |
| 6,635,868 | B2 * | 10/2003 | Shiokawa et al. | 250/288 |
| 7,266,991 | B2 * | 9/2007 | Bley | 73/31.05 |
| 7,290,439 | B2 * | 11/2007 | Perkins et al. | 73/40.7 |
| 7,847,242 | B2 * | 12/2010 | Wang et al. | 250/287 |
| 2007/0187586 | A1 * | 8/2007 | Geist et al. | 250/288 |

FOREIGN PATENT DOCUMENTS

DE    19853049    * 11/1998

* cited by examiner

*Primary Examiner* — Hezron E Williams
*Assistant Examiner* — Hoang Nguyen
(74) *Attorney, Agent, or Firm* — Renner, Otto, Boisselle & Sklar, LLP

(57) ABSTRACT

A leak detector comprises a cell provided with a tracer gas inlet preferably permeable to a tracer gas. In the cell, the tracer gas is caused to assume an energetically higher metastable state. By means of laser spectroscopy the absorption spectrum of the metastable tracer gas is sampled in an optical measuring section, whereby the presence of tracer gas is detected.

5 Claims, 2 Drawing Sheets

LEAK DETECTOR WITH OPTICAL TRACER GAS DETECTION

BACKGROUND OF THE INVENTION

1. Field of the Invention

The invention refers to a leak detector with optical tracer gas detection.

2. Description of the Prior Art

Leak detectors typically include a mass spectrometer or a similar gas analysis apparatus to examine a gas drawn in for the presence of a tracer gas. Tracer gases of choice are helium and other noble gases as well as hydrogen. The use of a mass spectrometer requires the generation of a high vacuum which in turn demands for bulky vacuum pumps. Further, leak detectors are known that have a cell which comprises gas-tight walls and is closed with a membrane selectively permeable to the tracer gas, where the membrane forms a tracer gas inlet. Within the cell, the partial pressure of the tracer gas rises if the tracer gas is present at the membrane outside the cell. Since the cell holds no other gases than the tracer gas, the partial pressure of the tracer gas can be measured in the cell by means of a total pressure measurement. This gives information about the tracer gas partial pressure in the ambience. Thus, it is not only possible to detect the presence of tracer gas in the environment, but quantitative measurements are also possible. Pressure measurement inside the cell requires an intricate measuring device and a pumping function for the removal of the tracer gas. Penning or magnetron cells are suitable cells for this purpose.

DE 198 53 049 C2 describes another type of leak detector wherein a carrier gas is pumped through the object under test and wherein it is detected whether a tracer gas is present in the outflowing carrier gas. If this is the case, a leak in the object under test has been determined. The gas pumped from the object under test is passed through a discharge cell and caused to assume a metastable state. The carrier gas or tracer gas of choice for generating the gas discharge is helium. It is the purpose of the gas discharge to cause the tracer gas to assume the metastable state. The discharge cell includes an optical measurement path formed by a laser and a photo detector receiving the beam from the laser. The excited atoms of the tracer gas or of the tracer gas component to be detected are measured in the discharge cell by means of laser absorption spectrometry. This measuring principle requires that the carrier gas necessary for the excitation of the tracer gas be passed through the object under test.

SUMMARY OF THE INVENTION

It is an object of the present invention to provide a leak detector with a high sensitivity, a short response time and a simple structure.

The present leak detector is defined in claim 1. The leak detector comprises a cell with a gas inlet that is preferably permeable to a tracer gas. Ideally, the gas inlet is selectively or exclusively permeable to the tracer gas. This means that the membrane blocks the outside or atmospheric pressure, while it allows the tracer gas and possibly also singular other gases to pass. For instance, the membrane may comprise a thin layer of quartz or silicon oxide ($SiO_2$). The same is selectively permeable to light gases such as hydrogen or helium, especially when it is heated. The membrane keeps heavier gases and water vapor as well as anything else from the inside of the cell that could disturb the metastable state of the tracer gas. Thus, an "absolute selectivity" of the membrane to the tracer gas is not required. Rather, it is sufficient that the membrane allows the tracer gas to pass, while other gas components may also be entrained.

The invention allows for different leak test methods. For instance, the leak detector may be a sniffer leak detector comprising a probe passed along the outside of an object under test and detecting the escape of a tracer gas. On the other hand, the leak detector may also comprise a suction device drawing gas from an object under test, where a region containing the tracer gas is created outside the object under test.

Although it is not necessary to evacuate the cell, a preferred embodiment of the invention provides that the cell is connected with a vacuum pump device.

The excitation of the metastable state can be achieved by particle collisions of a buffer gas in a gas plasma or in a gas discharge. Another possibility provides for a direct electron impact, wherein the electrons coming from an electron source (cathode) hit the tracer gas and take it to a higher energetic level. Here, no buffer gas is needed. Further possible ways of excitation are excitation by X-rays, multi-photon excitation, Raman-type population, and a collision with neutral atoms/molecules, e.g. in an ultrasound beam.

The optical detection of metastable helium may be effected by absorption spectroscopy or fluorescence spectroscopy. For absorption spectroscopy, the laser source may be subjected to modulation that covers the absorption spectrum of higher excitation states.

According to a special embodiment provides that the cell additionally comprises a pump connection consisting of a membrane that is preferably permeable to the tracer gas, wherein the pump connection connects the cell to a chamber which is in turn connected to a vacuum pump device or an atmosphere free of tracer gas. The pump connection allows the removal of the helium from the cell, either into the ambience or by pumping action. It is the purpose of the pump connection to vent the tracer gas from inside the cell to the outside after the tracer gas has been removed from in front of the membrane.

In another embodiment of the invention, the cell is hermetically sealed except for the tracer gas inlet, in which way a partial pressure of the tracer gas develops inside the cell that is equal to the partial pressure of the tracer gas in the ambience.

BRIEF DESCRIPTION OF THE DRAWINGS

A full and enabling disclosure of the present invention including the best mode thereof, enabling one of ordinary skill in the art to carry out the invention, is set forth in greater detail in the following description, including reference to the accompanying drawings in which.

DESCRIPTION OF PREFERRED EMBODIMENTS

Figure 1:
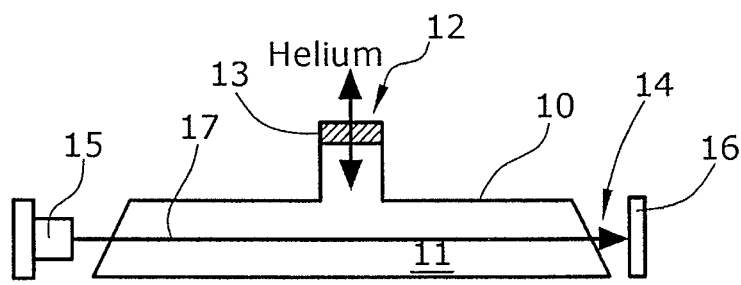
FIG. 1 is a schematic illustration of the principle of the invention.

The general idea of the invention is illustrated in FIG. 1. The heart of the present leak detector is a cell 10 with an inner space 11 that is closed with a tracer gas inlet 12. The tracer gas inlet 12 comprises a membrane 13 that is preferably permeable to the tracer gas, e.g. helium. Preferably, it is a membrane selectively permeable only to helium. The membrane 13 is permeable in both directions. Thus, a pressure develops in the inner space 11 of the cell 10 that is equal to the partial pressure of the tracer gas outside the cell. The cell 10 has been evacuated before, so that it cannot hold any other gas but the tracer gas. The cell 10 contains an excitation device (not illustrated) by which the tracer gas is taken to a higher state of excitation.

The optical detection of the metastable tracer gas is effected with a measuring section 14 comprising a laser 15 and a photo detector 16 receiving the laser beam 17. The wavelength of the laser beam 17 emitted by the laser 15 is set according to an absorption line of the tracer gas (e.g. helium). For instance, the wavelength of the laser beam is set to 1083.034 nm so as to achieve a higher energy level $2^3P_2$ starting from the metastable level $2^3S_1$. With a laser frequency of 1083.025 nm, the energy level $2^3P_1$ would be achieved, and the energy level $2^3P_0$ would be reached with a wavelength of 1082,908 nm. When the tracer gas in the metastable state is illuminated by the wavelength mentioned, this wavelength is absorbed. Reference may be made to DE 198 53 049 C2 for details.

The radiation of the laser beam 17 is modulated so that a region covering the basic wavelength is detected. Absorption spectroscopy allows the detection of the absorption wavelengths. This principle is the same for all embodiments described hereinafter. The cell 10 could also be referred to as a spectrometer cell. Preferably, it is made of glass. The laser 15 and the photo detector 16 may be arranged in the cell 10 or outside the same.

Figure 2:
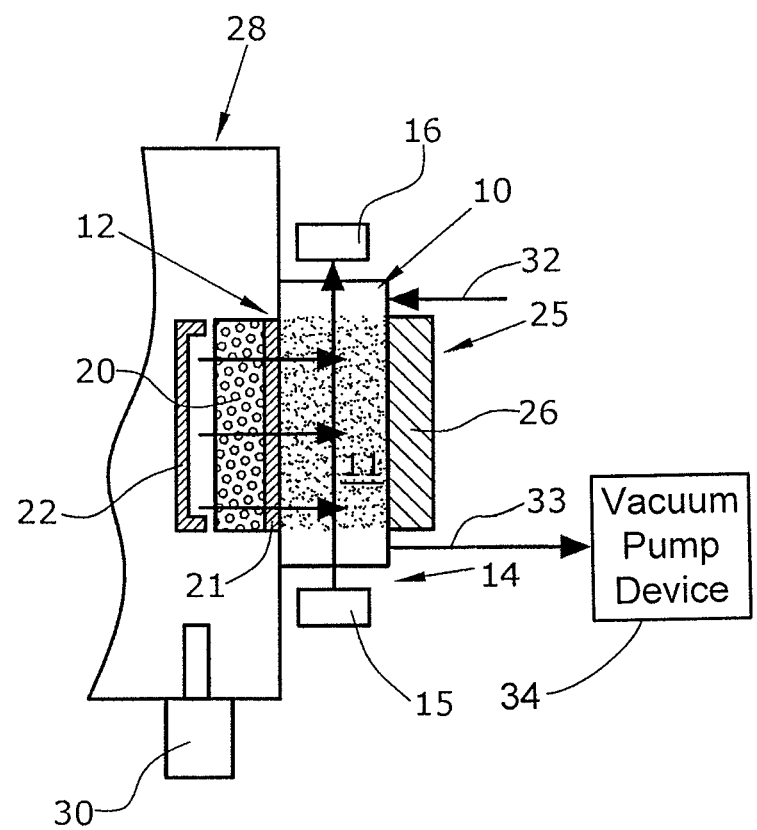
FIG. 2 illustrates a concrete first embodiment in which the metastable excitation is achieved with a gas plasma from a buffer gas.

In the embodiment of FIG. 2, the cell 10 is provided with the measuring section 14. The cell is closed with a membrane 13 that is selectively permeable to the tracer gas (helium) or is at least preferably pervious to this gas. The membrane 13 has a porous supporting body 20 that is permeable to gas and a thin filter layer 21 of $SiO_2$ or quartz of a few nm thickness. A heating device 22, which is preferably external to the absorption section, serves to heat the filter layer.

This heating device is arranged at a distance from the filter layer 21 so that tracer gas can pass through the filter layer. Details on the structure of the membrane 13 are described in EP 0 831 964 B1 (=U.S. Pat. No. 6,277,177 B1).

The cell 10 comprises an excitation device 25 by which helium that has entered the cell is caused to assume a metastable state. In this instance, the excitation device comprises a cathode 26 which is part of a gas discharge section which produces a plasma from a buffer gas in the inner space 11. The buffer gas is an inert gas, preferably a noble gas, except for helium which is used as the tracer gas.

The cell 10 may
 a) be exposed either directly or indirectly to ambient air (sniffer leak detection), or
 b) be connected to a test chamber 28 which contains an object under test filled with tracer gas (integral leak test), or
 c) be connected with an evacuated object under test that is sprayed with tracer gas from the outside (vacuum leak test).

The tracer gas will then pass the membrane 13 and reach the inner space 11 of the cell 10. A test leak 30 can be provided in front of the inlet, from which tracer gas escapes in a defined volume flow. The test leak 30 is used to calibrate the leak detector so as to obtain quantitative information about the tracer gas concentration.

The cell 10 is further provided with a buffer gas inlet 32 through which a buffer gas is fed that is ionized by the excitation device 25. Moreover, the cell 10 is connected with a vacuum pump device 34 via a connection 33. The vacuum pump device draws the mixture of buffer gas and tracer gas from the cell 10.

Figure 3:
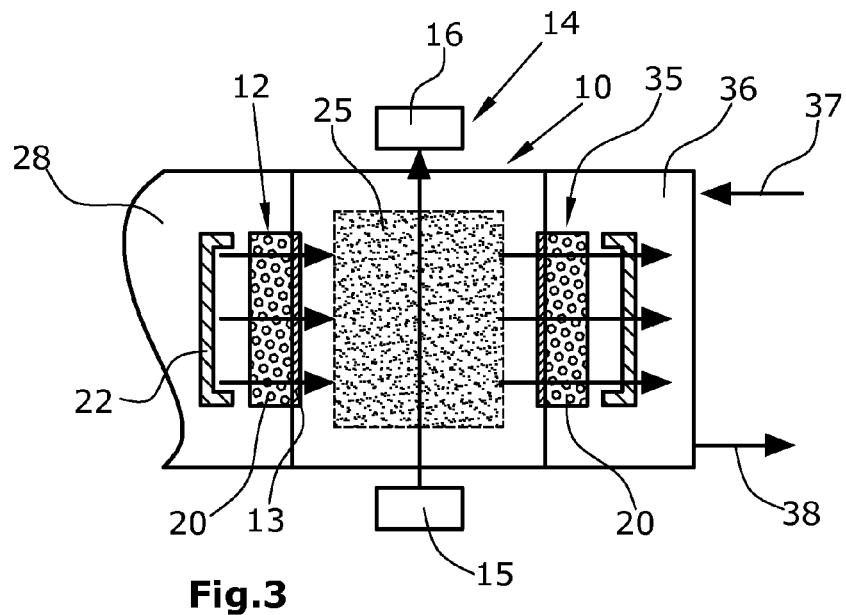
FIG. 3 illustrates a second embodiment comprising an additional pump connection at the cell for drawing tracer gas from the cell so as to achieve short response times.

The embodiment of FIG. 3 differs from the preceding embodiment in that the cell 10 is not connected to a vacuum pump device. The cell 10 comprises the tracer gas inlet 12 connected with the test chamber 28. The cell further includes the measuring section 14 as well as an excitation device 25 formed by electrodes.

The cell 10 of FIG. 3 is provided with a pump connection 35 connected with a suction chamber 36. The pump chamber 36 has a buffer gas connection 37 and a pump connection 38 connected with a vacuum pump device (not illustrated). It is the function of the pump connection 35 to selectively conduct only tracer gas from the cell 10 into the suction pump 36. It is configured in the same manner as the tracer gas inlet 12. Together with the pump chamber 36, the pump connection 35 forms a pump or a one-way valve for removing the tracer gas from the cell 10.

Figure 4:
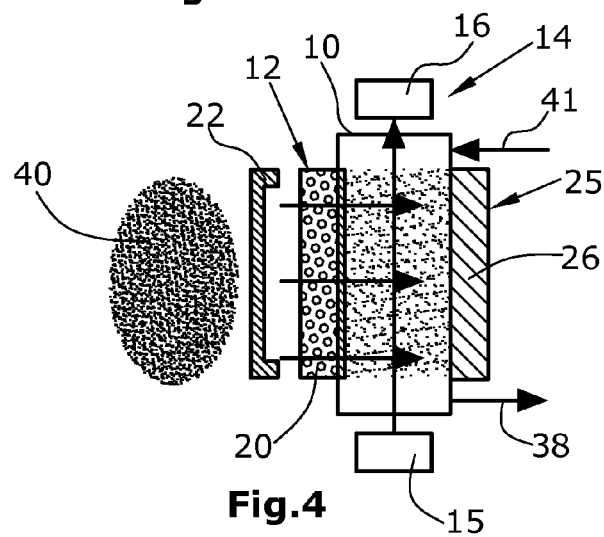
FIG. 4 illustrates an embodiment in which the cell comprises a vacuum connection.

The embodiment of FIG. 4 is mostly similar to that of FIG. 2, however with the difference that a test chamber 28 (FIG. 2) is omitted. The tracer gas inlet 12 is exposed to ambient air either directly or by drawing in ambient air through a sniffer conduit and feeding it to the inlet 12. When a tracer gas cloud 40 reaches the tracer gas inlet 12, it is sucked in and the tracer gas gets into the cell 10 where it is caused to take a metastable state and is then detected. The cell further comprises a buffer gas connection 41 and a pump connection 38 that may be connected to a vacuum pump device as illustrated in FIG. 2. The embodiment of FIG. 4 is suited for use as a sniffer leak detector.

Figure 5:
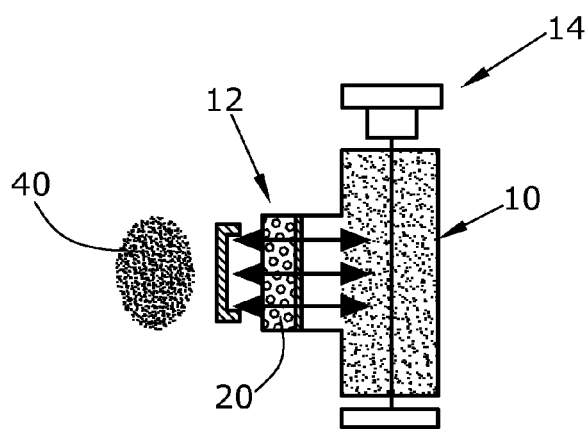
FIG. 5 illustrates another embodiment in which the cell is sealed hermetically except for the tracer gas inlet so that a partial pressure develops inside the cell that is equal to the partial pressure in the ambience.

FIG. 5 illustrates another embodiment of a leak detector comprising a cell 10 with a tracer gas inlet 12, as well as a measuring section 14 of the kind described before. The cell 10 has no pump connection. When tracer gas is present in front of the tracer gas inlet 12, a pressure develops inside the cell 10 that is equal to the partial pressure of the tracer gas (helium) in front of the membrane. If the tracer gas is removed from in front of the membrane, the tracer gas flows from the cell 10 through the tracer gas inlet 12 back into the atmosphere.

The embodiment of FIG. 5 also comprises an excitation device (not illustrated) that causes the helium in the cell 10 to assume a metastable state so that it is optically detectable. When the metastable helium contacts the wall of the cell or the tracer gas inlet or another device, it looses energy and is thus restored to its ground state. Therefore, the helium escaping from the cell 10 is no longer in a metastable state.

Although the invention has been described and illustrated with reference to specific illustrative embodiments thereof, it is not intended that the invention be limited to those illustrative embodiments. Those skilled in the art will recognize that variations and modifications can be made without departing from the true scope of the invention as defined by the claims that follow. It is therefore intended to include within the invention all such variations and modifications as fall within the scope of the appended claims and equivalents thereof.

The invention claimed is:

1. A leak detector with optical tracer gas recognition, comprising:
   a cell with a tracer gas inlet comprising a membrane selectively or exclusively permeable to a tracer gas,
   an excitation device in the cell for causing the tracer gas to assume an energetically higher metastable state, and
   an optical measuring section formed by a laser and a photo detector receiving the laser beam,
   wherein the cell comprises an electron source that uses electron impacts to cause the tracer gas to assume the metastable state.

2. The leak detector of claim 1, wherein the cell is connected to a vacuum pump device.

3. A leak detector with optical tracer gas recognition, comprising:
   a cell with a tracer gas inlet comprising a first membrane preferably selectively or exclusively permeable to a tracer gas,
   an excitation device in the cell for causing the tracer gas to assume an energetically higher metastable state, and
   an optical measuring section formed by a laser and a photo detector receiving the laser beam,
   wherein the cell additionally comprises a pump connection with a second membrane selectively or exclusively permeable to the tracer gas, wherein the pump connection connects the cell to a pump chamber which in turn is connected to a vacuum pump device.

4. The leak detector of claim 3, wherein the pump chamber comprises a buffer gas connection and a pump connection.

5. The leak detector of claim 1, wherein the cell is sealed hermetically except for the tracer gas inlet, with a partial pressure of the tracer gas developing within the cell that is equal to the partial pressure of the tracer gas in the ambience.

* * * * *